US012649363B2

(12) United States Patent
Watanabe

(10) Patent No.: US 12,649,363 B2
(45) Date of Patent: Jun. 9, 2026

(54) VEHICLE NOTIFICATION SYSTEM

(71) Applicant: DENSO CORPORATION, Kariya-city (JP)

(72) Inventor: Satoshi Watanabe, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 55 days.

(21) Appl. No.: 18/635,973

(22) Filed: Apr. 15, 2024

(65) Prior Publication Data

US 2024/0343117 A1     Oct. 17, 2024

Related U.S. Application Data

(63) Continuation of application No. PCT/JP2022/037442, filed on Oct. 6, 2022.

(30) Foreign Application Priority Data

Nov. 2, 2021     (JP) ................................. 2021-179450

(51) Int. Cl.
| | |
|---|---|
| *B60K 35/22* | (2024.01) |
| *B60K 35/10* | (2024.01) |
| *B60K 35/81* | (2024.01) |
| *B60K 37/20* | (2024.01) |
| *B60W 50/14* | (2020.01) |

(52) U.S. Cl.
CPC .............. *B60K 35/81* (2024.01); *B60K 35/10* (2024.01); *B60K 35/22* (2024.01); *B60K 37/20* (2024.01); *B60W 50/14* (2013.01); *B60K*

*2360/175* (2024.01); *B60K 2360/33* (2024.01); *B60W 2050/146* (2013.01)

(58) Field of Classification Search
None
See application file for complete search history.

(56) References Cited

U.S. PATENT DOCUMENTS

| | | | |
|---|---|---|---|
| 11,644,834 B2 * | 5/2023 | Ditty ................... | G06F 15/7807 |
| | | | 701/23 |
| 2019/0025829 A1 | 1/2019 | Fujiwara | |
| 2020/0361479 A1 * | 11/2020 | Hirasawa ............ | B60W 50/029 |
| 2023/0086986 A1 * | 3/2023 | Park .......................... | H02J 9/06 |
| | | | 701/26 |

FOREIGN PATENT DOCUMENTS

| | | |
|---|---|---|
| JP | 2019018836 A | 2/2019 |
| JP | 2020185864 A | 11/2020 |

* cited by examiner

*Primary Examiner* — James M Mcpherson
(74) *Attorney, Agent, or Firm* — Harness, Dickey & Pierce, PLC

(57) ABSTRACT

A vehicle notification system includes: a driving control ECU that controls an autonomous driving operation of a vehicle; and a display control ECU that controls a meter display of an instrument panel and a display of a drawing display unit. The display control ECU includes a lighting display unit that notifies a driver of the vehicle in a lighting state. The lighting display unit is driven by the driving control ECU. The display control ECU notifies the driver by executing the display of the drawing display unit when the driving control ECU detects that the lighting display unit turns on.

3 Claims, 19 Drawing Sheets

FIG. 1

[NOTIF METHOD]

| | MET TFT | OSD IMAGE |
|---|---|---|
| | TELLTALE | LIGHT UP |
| | MET BUZZER | SOUND |
| | AD BUZZER | SOUND |

[NOTIF METHOD]

| MET TFT | NO IMAGE | LIGHT UP |
|---|---|---|
| TELLTALE | | |
| MET BUZZER | NO SOUND | SOUND |
| AD BUZZER | | |

FIG. 3

[NOTIF METHOD]

| MET TFT | OSD IMAGE | NOT LIGHT UP |
|---|---|---|
| TELLTALE | SOUND | NO SOUND |
| MET BUZZER | | |
| AD BUZZER | | |

FIG. 4

[NOTIF METHOD]

| MET TFT | NO IMAGE | LIGHT UP |
|---------|----------|----------|
| TELLTALE | | |
| MET BUZZER | NO SOUND | SOUND |
| AD BUZZER | | |

FIG. 6

[NOTIF METHOD]

| MET TFT | H/U IMAGE |
|---|---|
| TELLTALE | LIGHT UP |
| MET BUZZER | SOUND |
| AD BUZZER | SOUND |

| [NOTIF METHOD] | | |
|---|---|---|
| MET TFT | MET TFT | NO IMAGE |
| TELLTALE | TELLTALE | LIGHT UP |
| MET BUZZER | MET BUZZER | NO SOUND |
| AD BUZZER | AD BUZZER | SOUND |

IN CASE OF CAN NOTIF (AT S14)

MET                     H/U                     AD ECU

DRI TAKEOVER NOTIF

DRI TAKEOVER NOTIF

LIGHT UP LED

DETECT LED LIGHT UP

TAKEOVER IMAGE REQ
(THRO LVDS)

GENERATE TAKEOVER IMAGE

OUTPUT IMAGE

IN CASE OF NO CAN NOTIF (AT S18)

[NOTIF METHOD]

| | MET TFT | NO IMAGE |
| --- | --- | --- |
| TELLTALE | | LIGHT UP |
| MET BUZZER | | NO SOUND |
| AD BUZZER | | SOUND |

FIG. 13

[NOTIF METHOD]

| | MET TFT | H/U IMAGE |
| --- | --- | --- |
| TELLTALE | | NOT LIGHT UP |
| MET BUZZER | | SOUND |
| AD BUZZER | | NO SOUND |

FIG. 15

| [NOTIF METHOD] | | |
| --- | --- | --- |
| MET TFT | NO IMAGE | |
| TELLTALE | LIGHT UP | |
| MET BUZZER | NO SOUND | |
| AD BUZZER | SOUND | |

MET          AD ECU

DRI TAKEOVER NOTIF THRO CAN

LIGHT UP LED

DETECT LED LIGHT UP

GENERATE TAKEOVER IMAGE

FIG. 22

|  | MET INF PROCESS | MET TFT DRAW | CID TFT DRAW |
|---|---|---|---|
| 6TH EMB | MET | H/U | H/U |
| 7TH EMB | H/U | H/U | H/U |
| 8TH EMB | MET | MET | H/U |

VEHICLE NOTIFICATION SYSTEM

CROSS REFERENCE TO RELATED APPLICATION

The present application is a continuation application of International Patent Application No. PCT/JP2022/037442 filed on Oct. 6, 2022, which designated the U.S. and claims the benefit of priority from Japanese Patent Application No. 2021-179450 filed on Nov. 2, 2021. The entire disclosures of all of the above applications are incorporated herein by reference.

TECHNICAL FIELD

The present disclosure relates to a vehicle notification system.

BACKGROUND

At levels 3 and above of autonomous driving in vehicles, the autonomous driving system mainly executes the driving operations. If the system determines that the level 3 state cannot be maintained under accidental circumstances, a driving takeover request is made so that the driver can respond appropriately. This driving takeover request must be made under all circumstances, so basically, it is made by duplicating the control system, for example, so that the driving takeover request can be executed even if the ECU (i.e., Electronic Control Unit) mounted in the vehicle malfunctions or the power supply is lost.

The ECU that controls vehicle behavior includes a driving control ECU that performs an autonomous driving operation and a camera ECU that uses a camera to capture images of the surrounding area. The ECU that has a notification function includes the driving control ECU described above and the meter ECU that controls an instrument panel to display a meter. The notification when requesting to take over the driving operation requires both a sound that can be recognized no matter where the driver is looking and a display image that can be recognized even by a deaf person. These notifications are often made by, for example, a buzzer or LED driven by a driving control ECU, a buzzer or a liquid crystal panel driven by a meter ECU.

SUMMARY

According to an example, a vehicle notification system may include: a driving control ECU that controls an autonomous driving operation of a vehicle; and a display control ECU that controls a meter display of an instrument panel and a display of a drawing display unit. The display control ECU includes a lighting display unit that notifies a driver of the vehicle in a lighting state. The lighting display unit is driven by the driving control ECU. The display control ECU notifies the driver by executing the display of the drawing display unit when the driving control ECU detects that the lighting display unit turns on.

BRIEF DESCRIPTION OF THE DRAWINGS

The above and other objects, features and advantages of the present disclosure will become more apparent from the following detailed description made with reference to the accompanying drawings. In the drawings:

FIG. 1 is a functional block diagram showing the configuration of a vehicle notification system according to a first embodiment, and showing a state in which a first power source is lost;

FIG. 3 is a functional block diagram showing the configuration of a vehicle notification system according to a second embodiment, and showing a state in which a first power source is lost;

FIG. 4 is a diagram showing a state in which the second power source is lost in the same functional block diagram in FIG. 3;

FIG. 6 is a functional block diagram showing the configuration of a vehicle notification system according to a third embodiment, and showing a state in which a first power source is lost;

FIG. 13 is a diagram showing a state in which the second power source is lost in the same functional block diagram in FIG. 12;

FIG. 15 is a diagram showing a state in which the second power source is lost in the same functional block diagram in FIG. 14;

FIG. 22 is a diagram showing each notification mode of the sixth to eighth embodiments.

DETAILED DESCRIPTION

Figure 2:
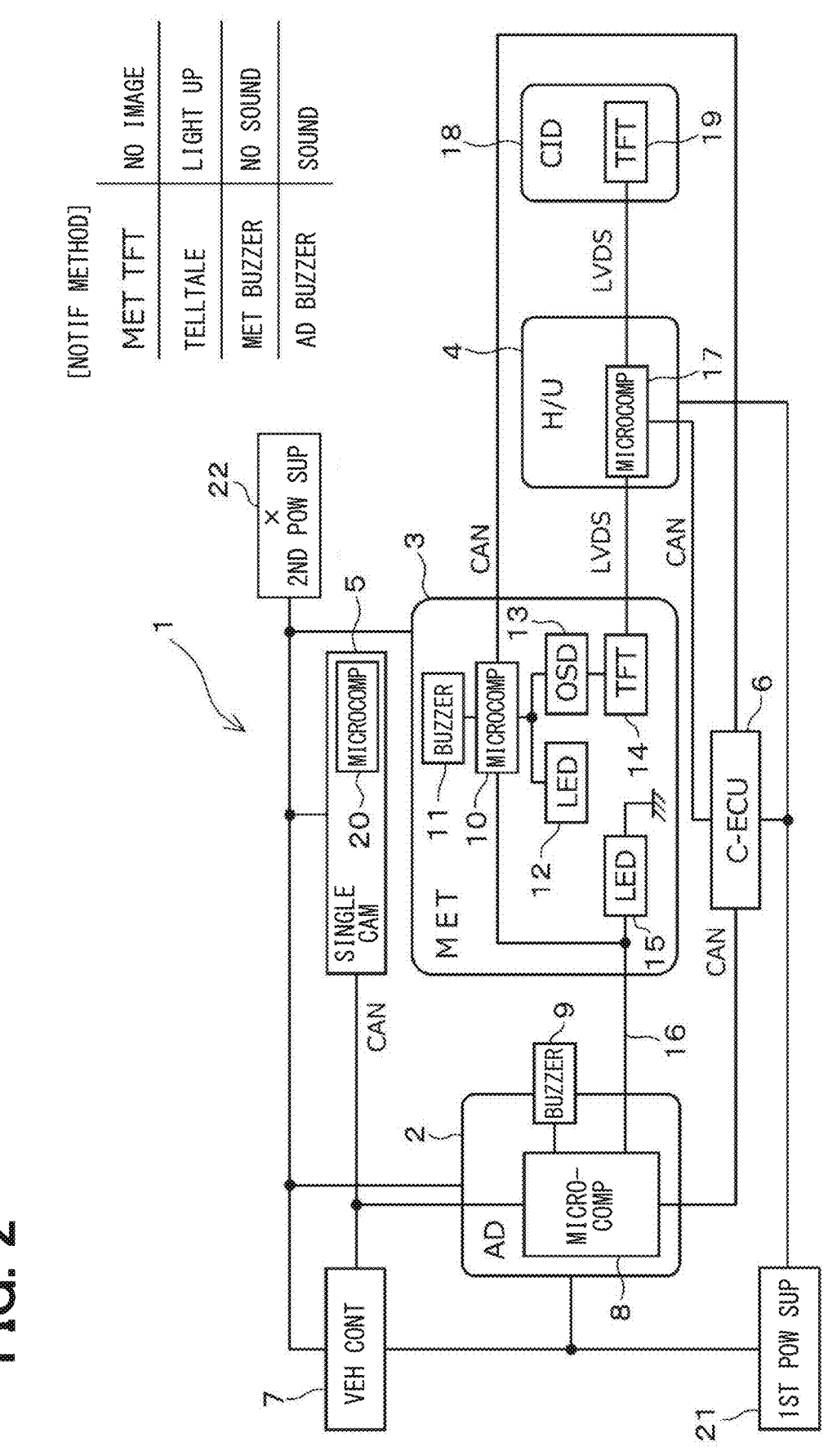
FIG. 2 is a diagram showing a state in which the second power source is lost in the same functional block diagram in FIG. 1.

If the ECU on the vehicle behavior side and the ECU on the notification side are separated from each other, it is necessary to communicate between the ECUs. For example, in communication performed between a large number of ECUs, such as CAN (registered trademark), there is a high possibility that communication will be interrupted if an ECU breaks down, so one-to-one direct communication is better. However, if the number of direct communications between ECUs increases, the number of communication drivers, connectors, and wiring will increase, so that the cost and the weight may increase.

The present embodiments have been made in view of the above circumstances, and an object thereof is to provide a vehicle notification system that can reliably notify a driver while suppressing an increase in wiring.

According to a vehicle notification system according to the first aspect, the vehicle notification system includes a driving control ECU that controls an autonomous driving operation of the vehicle, and a display control ECU that controls a display of the meter of the instrument panel and a display of the drawing display unit. The display control ECU includes a lighting display unit that notifies the driver in a lighting state, and the lighting display unit is driven by the driving control ECU. When the display control ECU detects that the lighting display unit is turned on by the driving control ECU, the display control ECU notifies the driver by displaying a display on the drawing display unit.

With this configuration, the display control ECU can notify the driver by displaying on the drawing display unit triggered by the lighting display unit being turned on by the driving control ECU. Therefore, the notification from the driving control ECU can be displayed on the drawing display unit to make it easier for the driver to understand.

According to the vehicle notification system according to a second aspect, the lighting display unit is driven at a high level by the driving control ECU, and the driving control ECU is configured to be able to output an intermediate level voltage for maintaining the lighting display unit in an off state from the output port that drives the lighting display unit. The driving control ECU outputs an intermediate level voltage to the output port during a period when the driving control ECU itself is operating normally. The display control ECU also displays on the drawing display unit when it is detected that the voltage of the output port falls below the intermediate level.

With this configuration, when the display control ECU determines that some anomaly has occurred in the driving control ECU and it is no longer able to operate normally, the display control ECU can notify the driver of this determination by displaying on the drawing display unit.

First Embodiment

Figure 1:
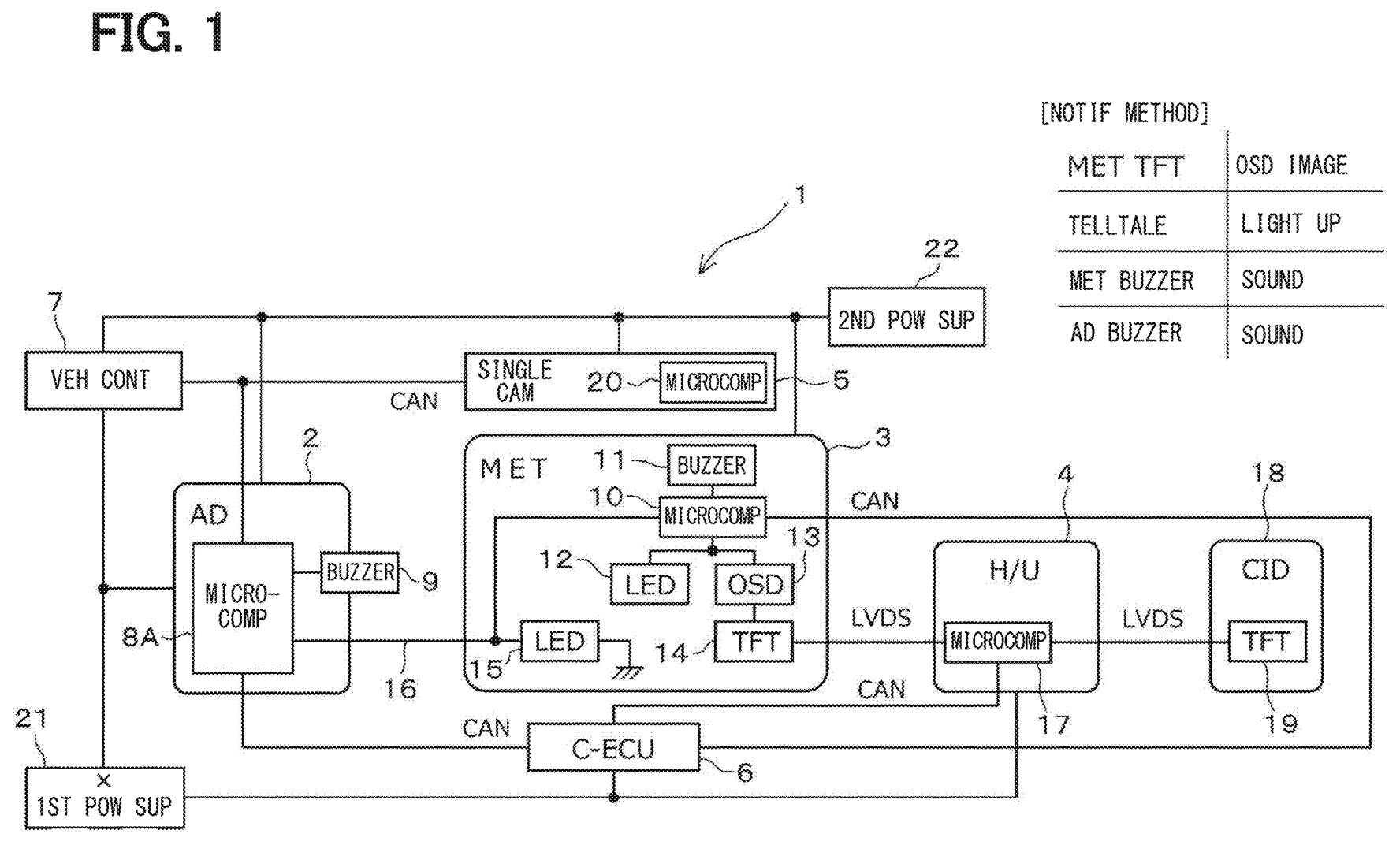

As shown in FIG. 1, the vehicle notification system 1 of this embodiment includes a driving control ECU 2, a meter ECU 3, an H/U (i.e., Head Unit) 4, a camera ECU 5, and a central ECU (i.e., C-ECU) 6. The driving control ECU 2 is an ECU that controls an autonomous driving operation of the vehicle via the vehicle control unit 7, and includes a microcomputer 8 and a buzzer 9. The buzzer 9 is driven by the microcomputer 8.

The meter ECU 3 is an ECU that controls the meter display on the instrument panel of the vehicle, and includes a microcomputer 10, a buzzer 11, an LED (i.e., Light Emission Display) 12, an OSD 13, a TFT 14, and the like.

The buzzer 11 and the LED 12 are driven by the microcomputer 10. The TFT 14 is a TFT (i.e., Thin Film Transistor) liquid crystal display, and the drawing display of the TFT 14 is controlled by the microcomputer 10 via the OSD 13. The OSD (i.e., On Screen Display) 13 is a control IC for the TFT 14.

Further, the meter ECU 3 includes an LED 15 corresponding to a lighting display unit, and this LED 15 is driven by the driving control ECU 2 via a direct wiring 16. The LED 15 is turned on when the driving control ECU 2 determines that the driving role should be taken over to the driver from the state in which the vehicle is autonomously driven. The LED 15 lights up when the anode side is driven to a high level. Then, the microcomputer 10 of the meter ECU 3 detects that the driving control ECU 2 controls the LED 15 to turn on by referring to the potential of the anode of the LED 15.

The H/U 4 controls the drawing display of the TFT 19 included in the center display (i.e., CID) 18 using the microcomputer 17. The microcomputer 17 also directly controls the drawing display of the TFT 14 included in the meter ECU 3, and in this case, it is possible to display rich contents with a larger amount of information than the drawing display by the OSD 13. Communication between the H/U 4, the meter ECU 3, and the center display 18 is performed by LVDS (i.e., Low Voltage Differential Signaling). Hereinafter, it will be referred to as CID18.

The camera ECU 5 is an ECU that uses the microcomputer 20 to control a camera that captures images of the surroundings of the vehicle for the driving control ECU 2 to autonomously drive the vehicle. The camera ECU 5 communicates with the driving control ECU 2 and the vehicle control unit 7 via CAN (registered trademark). The C-ECU 6 communicates with the driving control ECU 2, the meter ECU 3, and the H/U 4 via the CAN, and controls these ECUs in an integrated manner.

The operating power is supplied to each of the above configurations in two separate systems. The first power supply 21 supplies the electric power to the driving control ECU 2, the H/U 4, the C-ECU 6, and the vehicle control unit 7, and the second power supply 22 supplies the electric power to the driving control ECU 2, the meter ECU 3, the camera ECU 5, and the vehicle control unit 7. In other words, the power supply in two systems are supplied to both the driving control ECU 2 and the vehicle control unit 7.

Next, an operation of the present embodiment will be described. As shown in FIG. 1, when the first power source 21 is lost, the H/U 4 and the C-ECU 6 stop functioning. Here, "X" in a box of the first power source 21 in FIG. 1 indicates that the first power source 21 is lost. Similarly, "X" in boxes of the first power source 21 in FIGS. 3, 6, 12 and 14 indicates that the first power source 21 is lost. Further, "X" in boxes of the second power source 22 in FIGS. 2, 4, 7, 13 and 15 indicates that the second power source 22 is lost. Since the driving control ECU 2 is also supplied with the electric power from the second power source 22, it is possible to control the vehicle control unit 7, but due to the loss of the first power source 21, the driving control ECU 2 determines that the main role of the driving operation should be taken over to the driver. Therefore, the LED 15 of the meter ECU 3 is turned on. When the microcomputer 10 of the meter ECU 3 detects the lighting of the LED 15, it displays a drawing on the TFT 14 via the OSD 13 to display that the vehicle side is executing a notification that the driving operation should be taken over to the driver.

Further, at this time, the driving control ECU 2 may drive the buzzer 9 to make it sound, and the meter ECU 3 may also make the buzzer 11 sound to execute notification duplicately. "Telltale" shown in the drawings means notification by the LED 15, and "sound" means ringing.

On the other hand, as shown in FIG. 2, when the second power source 22 is lost, the meter ECU 3 and the camera ECU 5 stop functioning. When the driving control ECU 2 detects the loss of the second power source 22, the driving control ECU 2 determines that the driving role should be taken over to the driver, and turns on the LED 15 of the meter ECU 3.

Regardless of whether or not there is a power loss as described above, for example, when the meter ECU 3 detects that the CAN communication with the driving control ECU 2 has been interrupted, the LED 12 may be turned on to notify the driver.

As described above, according to the present embodiment, the vehicle notification system 1 includes the driving control ECU 2 that controls the autonomous driving operation of the vehicle, and the display control ECU 3 that controls the display of the meter on the instrument panel and the display of the TFT 14. The display control ECU 3 includes the LED 15 that notifies the driver in a lighting state, and the LED 15 is driven by the driving control ECU 2. When the display control ECU 3 detects that the LED 15 is turned on by the driving control ECU 2, the display control ECU 3 notifies the driver by displaying on the TFT 14.

With this configuration, the display control ECU 3 can notify the driver by displaying on the TFT 14 triggered by the LED 15 being turned on by the driving control ECU 2. Therefore, the notification from the driving control ECU 2 can be made easier for the driver to understand by not only lighting up the LED 15 but also displaying it on the TFT 14.

Second Embodiment

Figure 3:
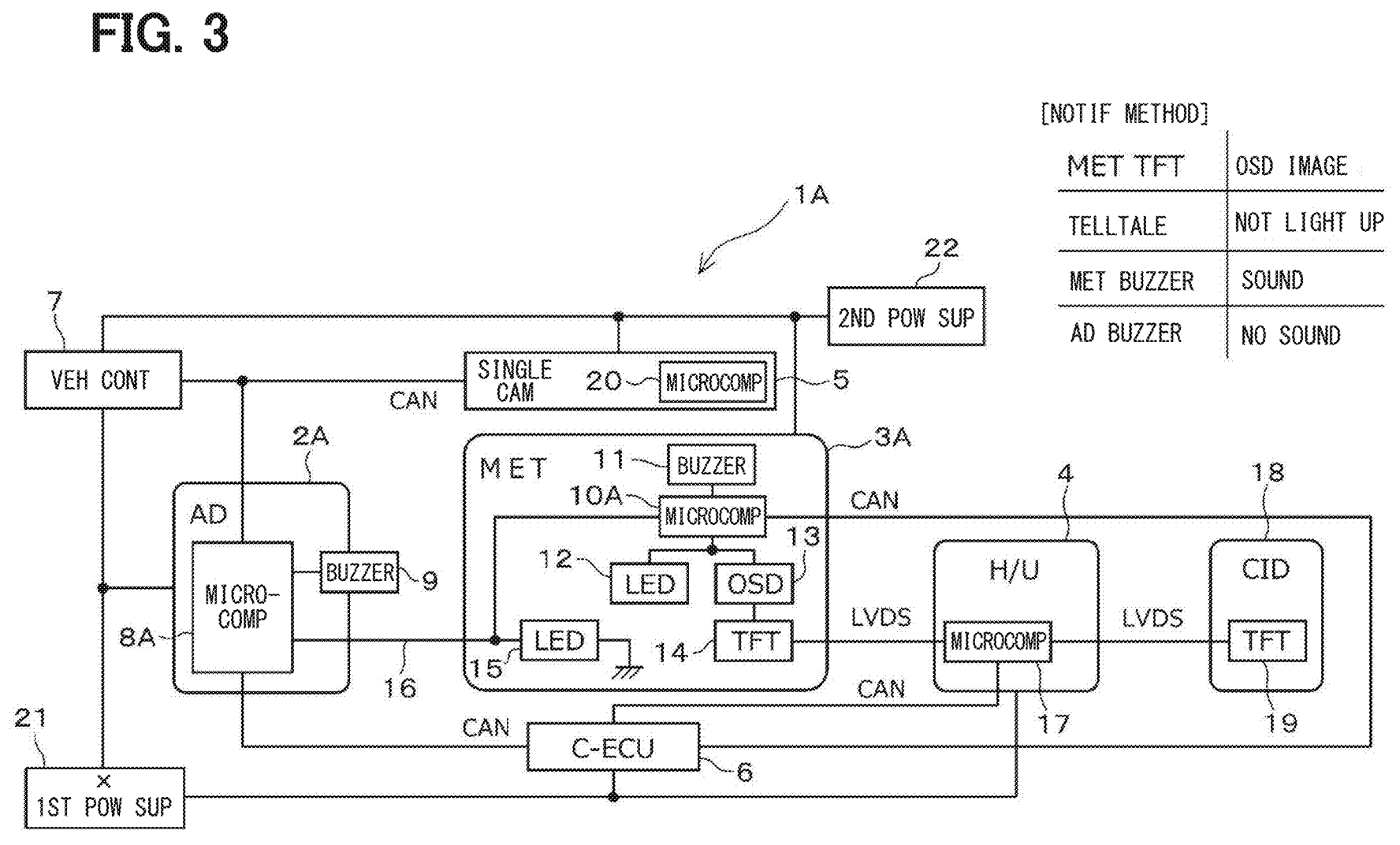
Figure 4:
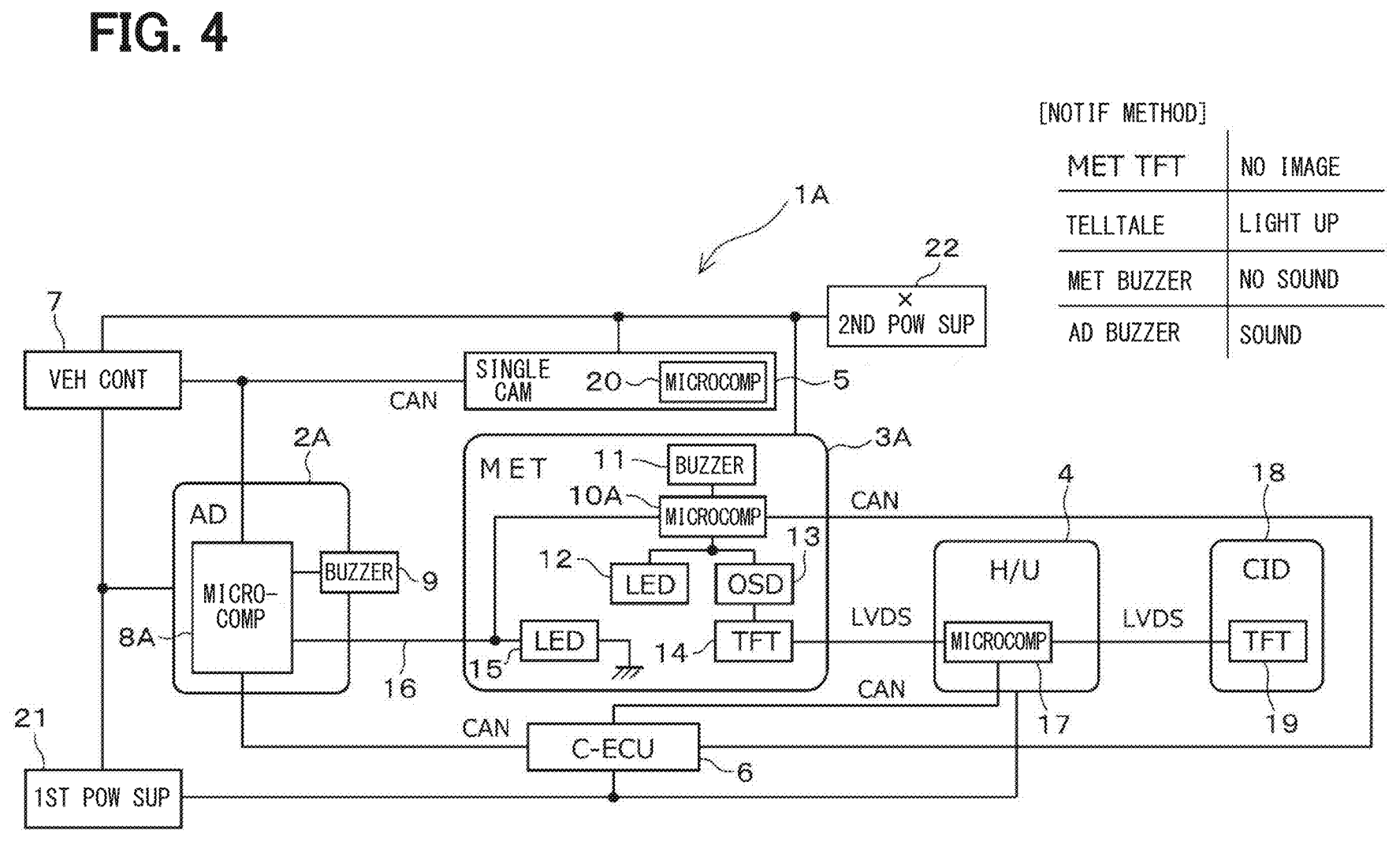
Figure 5:
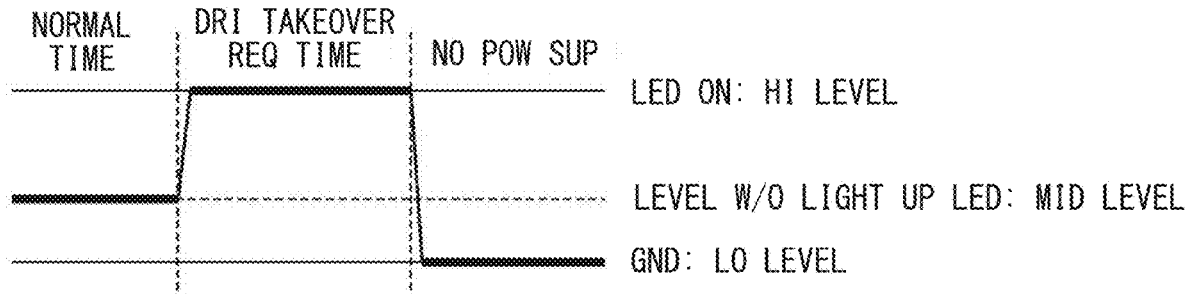
FIG. 5 is a diagram showing changes in voltage level at the output port of a microcomputer that drives an LED.

Hereinafter, the identical parts as those in the first embodiment will be designated by the same reference numerals for simplification of the description. Only differences from the first embodiment will be described below. As shown in FIGS. 3 and 4, in the vehicle notification system 1A of the second embodiment, the electric power is supplied to the driving control ECU 2A only from the first power source 21. In addition, as shown in FIG. 5, the microcomputer 8A of the driving control ECU 2A controls the voltage at the output port that drives the LED 15 to be one of three levels, which are a high level that lights up the LED 15, a low level that is the ground level, and a middle level that is higher than the low level but that does not turn on the LED 15.

The microcomputer 8A maintains the level of the output port at the middle level while the LED 15 is turned off. The microcomputer 10A of the meter ECU 3A can determine that the anode potential of the LED 15 is at the middle level.

Operation of the second embodiment will be described next. As shown in FIG. 3, when the first power source 21 is lost, the driving control ECU 2, the H/U 4, and the C-ECU 6 stop functioning. Therefore, the anode potential of the LED 15 changes from the middle level to the low level. When the microcomputer 10A of the meter ECU 3A detects that the above-mentioned anode potential has changed to the low level, it displays a drawing on the TFT 14 via the OSD 13, thereby notifying the driver that the driving operation should be taken over from the vehicle side to the driver. Moreover, at this time, the meter ECU 3A may sound the buzzer 11 to execute the duplicate notification.

On the other hand, as shown in FIG. 4, when the second power source 22 is lost, the same state is provided as in the case shown in FIG. 2.

Third Embodiment

Figure 6:
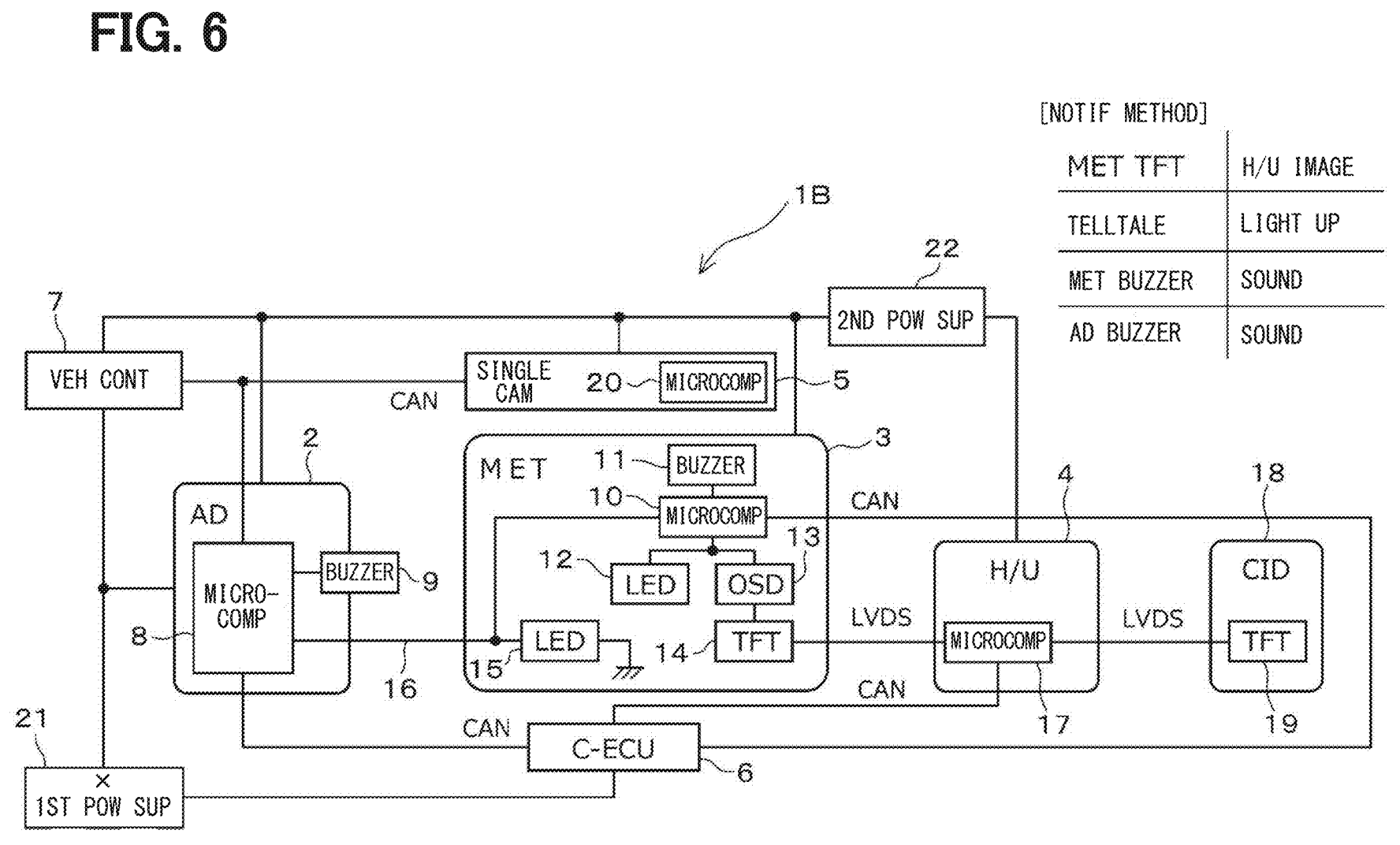
Figure 7:
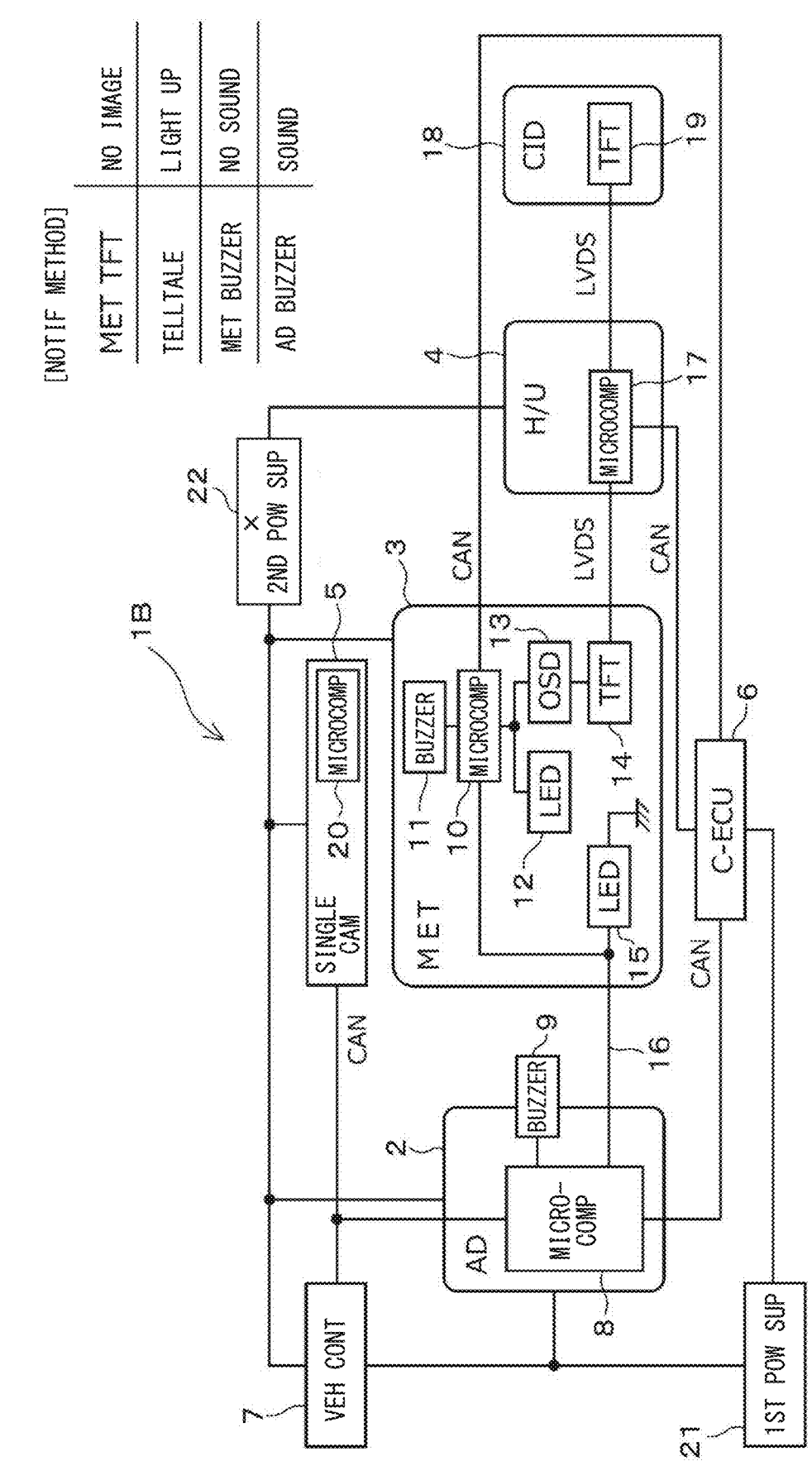
FIG. 7 is a diagram showing a state in which the second power source is lost in the same functional block diagram in FIG. 6.

In the vehicle notification system 1B of the third embodiment shown in FIGS. 6 and 7, the electric power is supplied to the H/U 4 from the second power source 22 instead of the first power source 21 in the configuration of the first embodiment. In this case, compared to the case shown in FIG. 1, the drawing display of the TFT 14 of the meter ECU 3 can be controlled by the microcomputer 17 of the H/U 4. As a result, richer content can be drawn compared to the case using the OSD 13 of the meter ECU 3, and the appeal of the notification to the driver can be further increased. When the second power supply 22 shown in FIG. 7 is lost, the case is similar to the case shown in FIG. 2.

Figure 8:
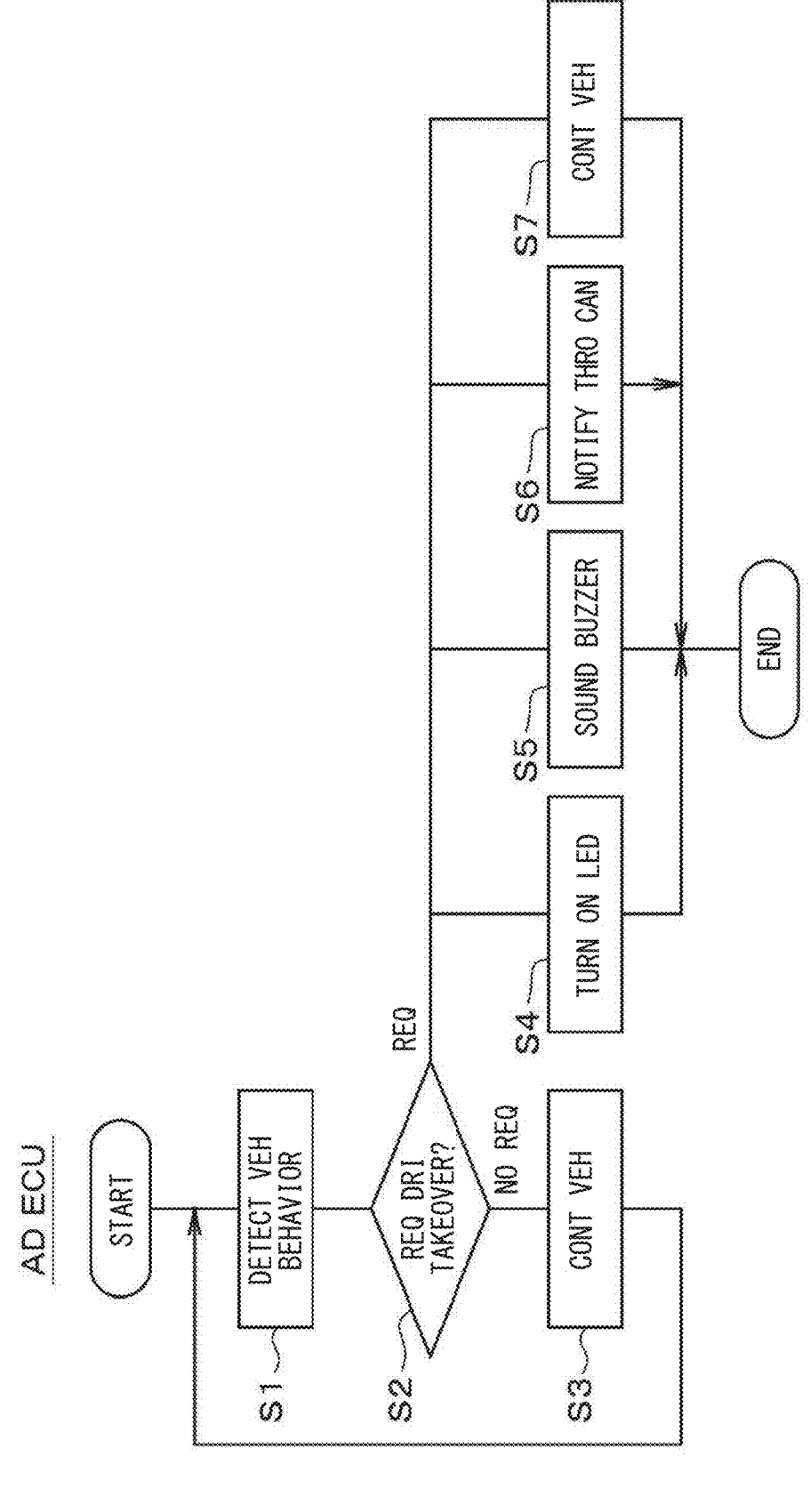
FIG. 8 is a flowchart showing processing contents of the driving control ECU.

Here, the processing contents by the driving control ECU 2 and the meter ECU 3 are shown in a flowchart. As shown in FIG. 8, the driving control ECU 2 detects the behavior of the vehicle from information collected from various sensors and the like (at S1). Then, it is determined whether or not it is necessary to take over the driving operation to the driver (at S2). If it is not necessary to take over, the vehicle is controlled by the vehicle control unit 7 (at S3) and the process returns to step S1. On the other hand, if it is determined that it is necessary to take over in step S2, the process of lighting up the LED 15 (at S4), the process of sounding the buzzer 9 (at S5), and the process of notifying the C-ECU 6 and the meter ECU 3 of the occurrence of an anomaly through the CAN communication (at S6) and the process of controlling the vehicle (at S7) are performed in parallel.

Figure 9:
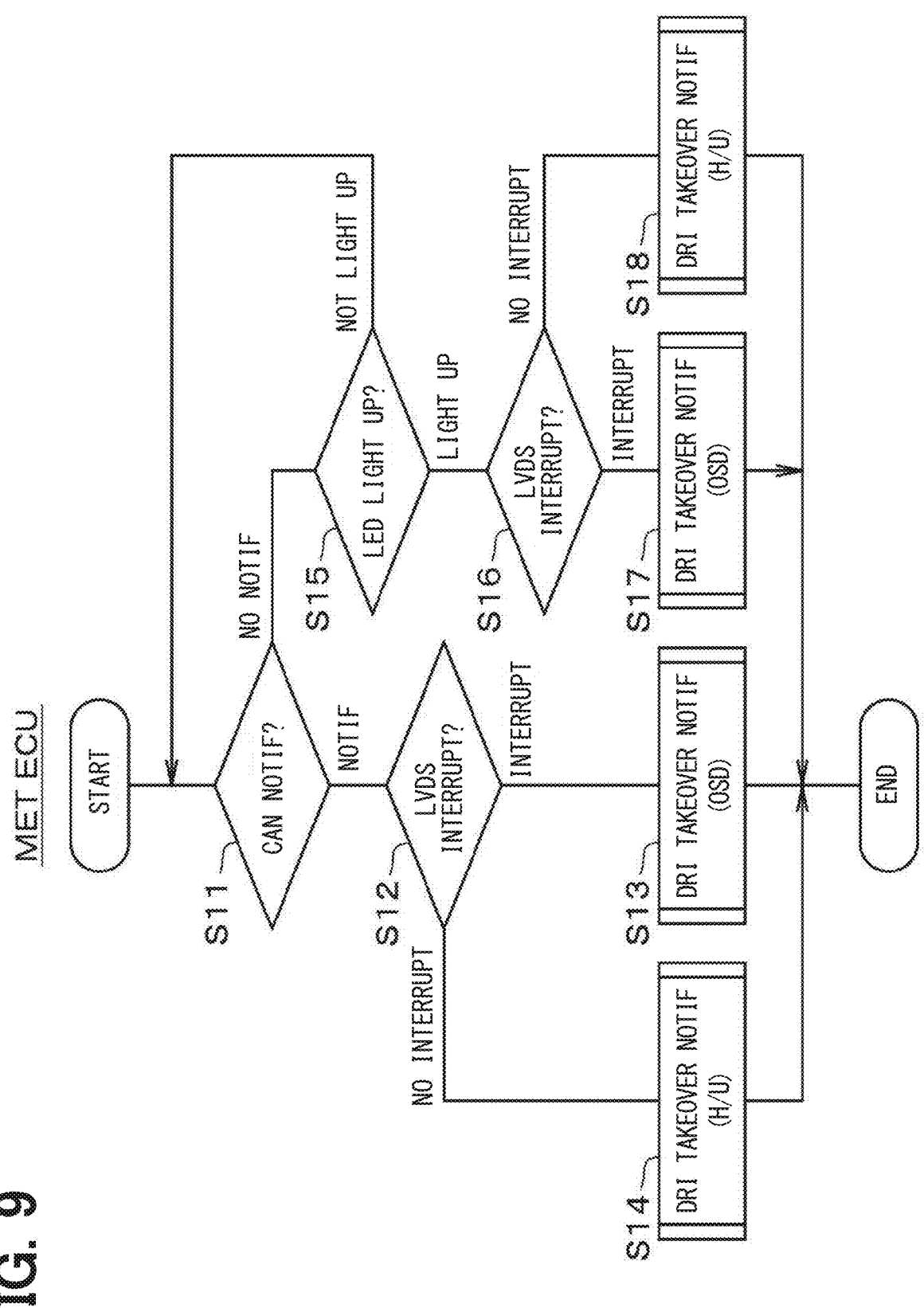
FIG. 9 is a flowchart showing the processing contents of the meter ECU.

As shown in FIG. 9, the meter ECU 3 determines whether or not there is a notification of the occurrence of an anomaly through the CAN communication (at S11). If there is no notification, it is determined whether the LED 15 is turned on by the driving control ECU 2 (at S15), and if it is not turned on, the process returns to step S11. If the LED 15 is turned on, it is determined whether the LVDS communication with the H/U4 is interrupted (at S16), and if it is not interrupted, the H/U4 notifies the driving operation takeover using the TFT 14 (at S18). If the LVDS communication is interrupted, the OSD 13 executes a notification of driving operation takeover using the TFT 14 (S17). On the other hand, if there is a notification of the occurrence of an anomaly through the CAN communication in step S11, the same processes as steps S16 to S18 are performed in steps S12 to S14.

Figure 10:
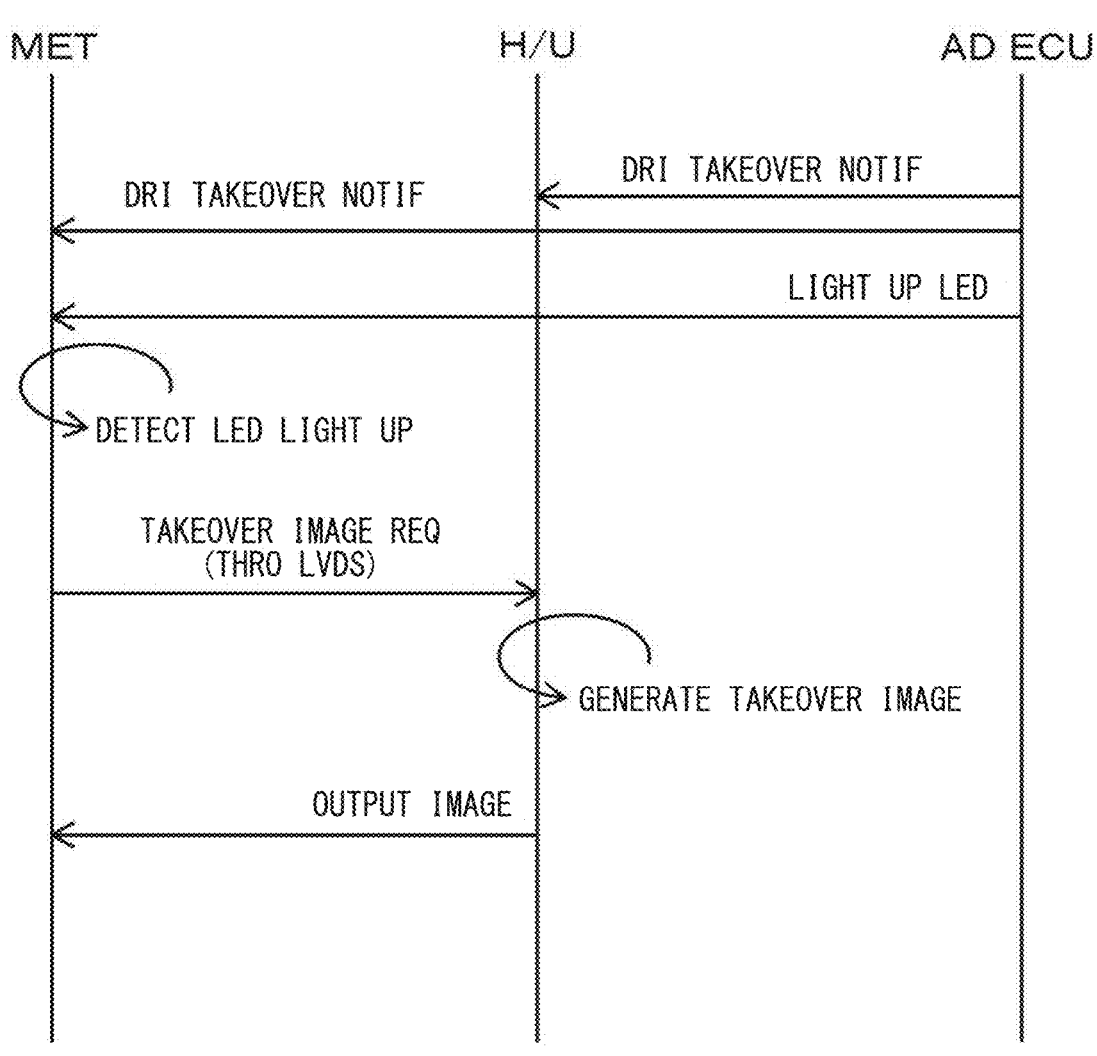
FIG. 10 is a sequence diagram showing processing between the driving control ECU, the H/U, and the meter ECU in case of the CAN communication.

In the process of step S14 shown in FIG. 10, the driving control ECU 2 sequentially notifies the H/U 4 and the meter ECU 3 of the driving operation takeover, and lights up the LED 15. When the meter ECU 3 detects the lighting of the LED 15, it requests the H/U 4 to display a drawing for the driving operation takeover notification via the LVDS communication. Here, this request may be made using a driving takeover notification from the driving control ECU 2 as a trigger.

The H/U 4 generates an image data for the driving operation takeover notification in response to the above request. Here, the image generation may also be performed using the driving takeover notification from the driving control ECU 2 as a trigger. Then, the generated image data is output to the meter ECU 3 and displayed on the TFT 14.

Figure 11:
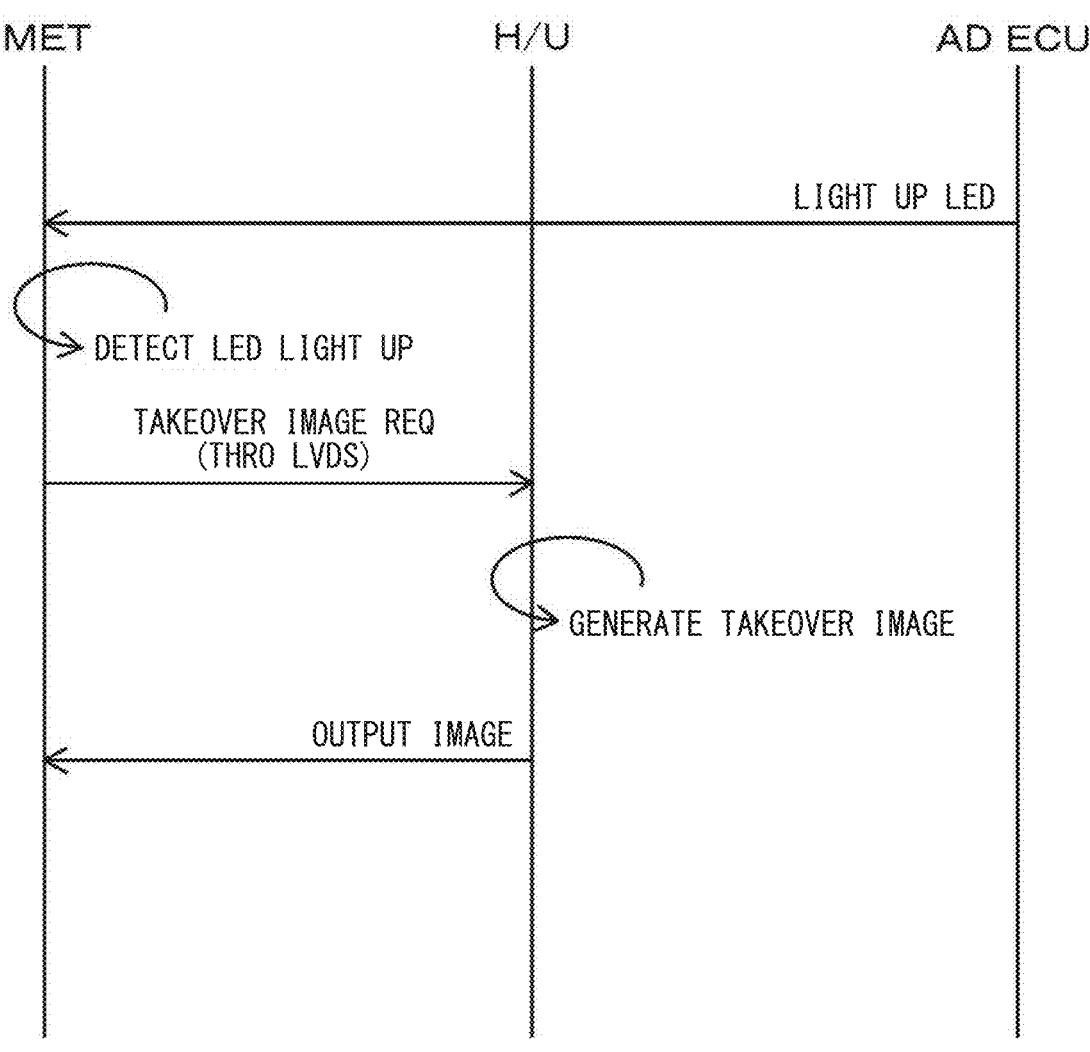
FIG. 11 is a sequence diagram showing processing between the driving control ECU, the H/U, and the meter ECU in case of no CAN communication.

In the process of step S18 shown in FIG. 11, the driving control ECU 2 turns on the LED 15, and when the meter ECU 3 detects that the LED is turned on, the H/U 4 is requested to display a drawing for the driving takeover notification via the LVDS communication. The subsequent processing is similar to that shown in FIG. 10.

Fourth Embodiment

Figure 12:
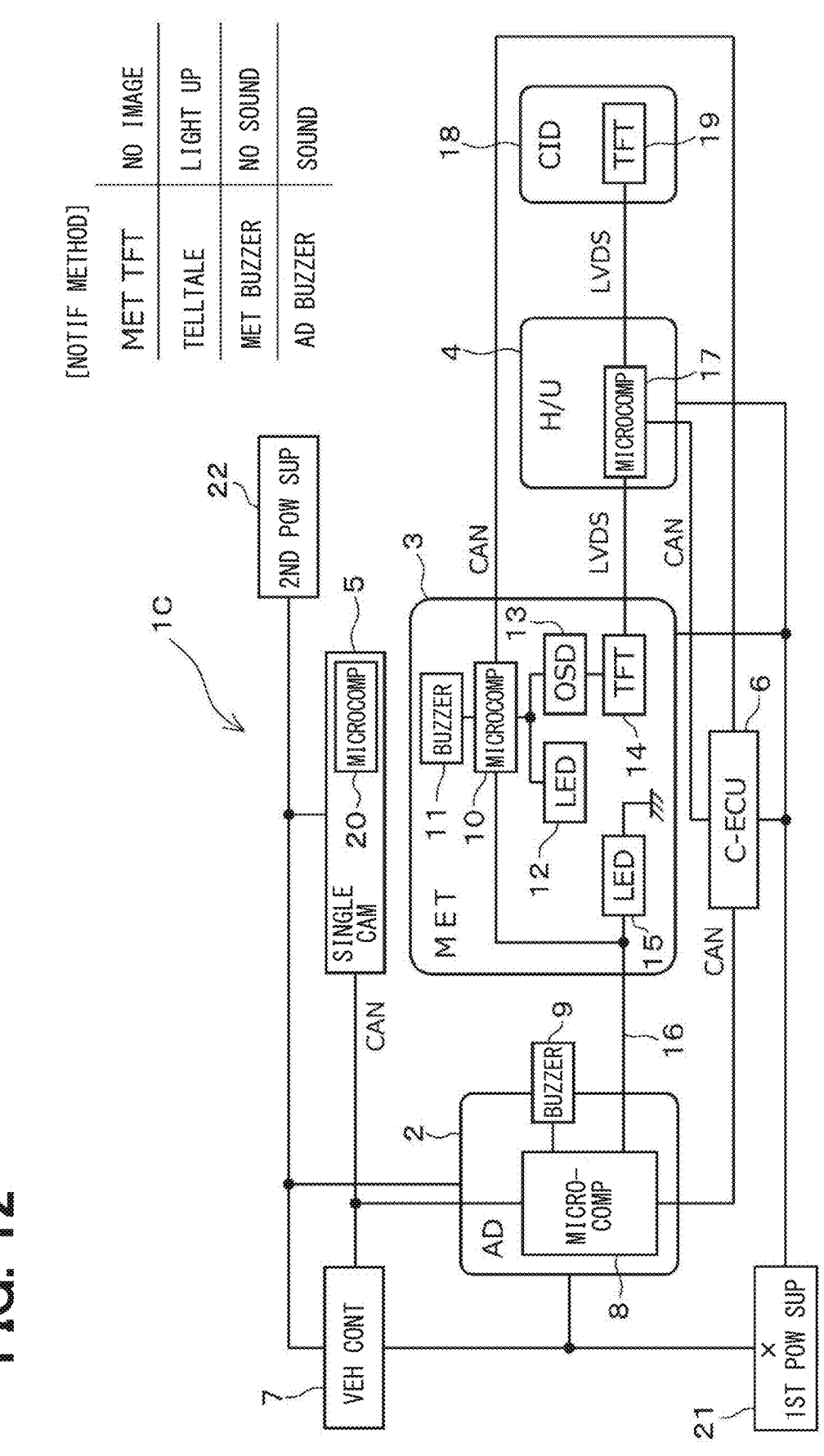
FIG. 12 is a functional block diagram showing the configuration of a vehicle notification system according to a fourth embodiment, and showing a state in which a first power source is lost.
Figure 13:
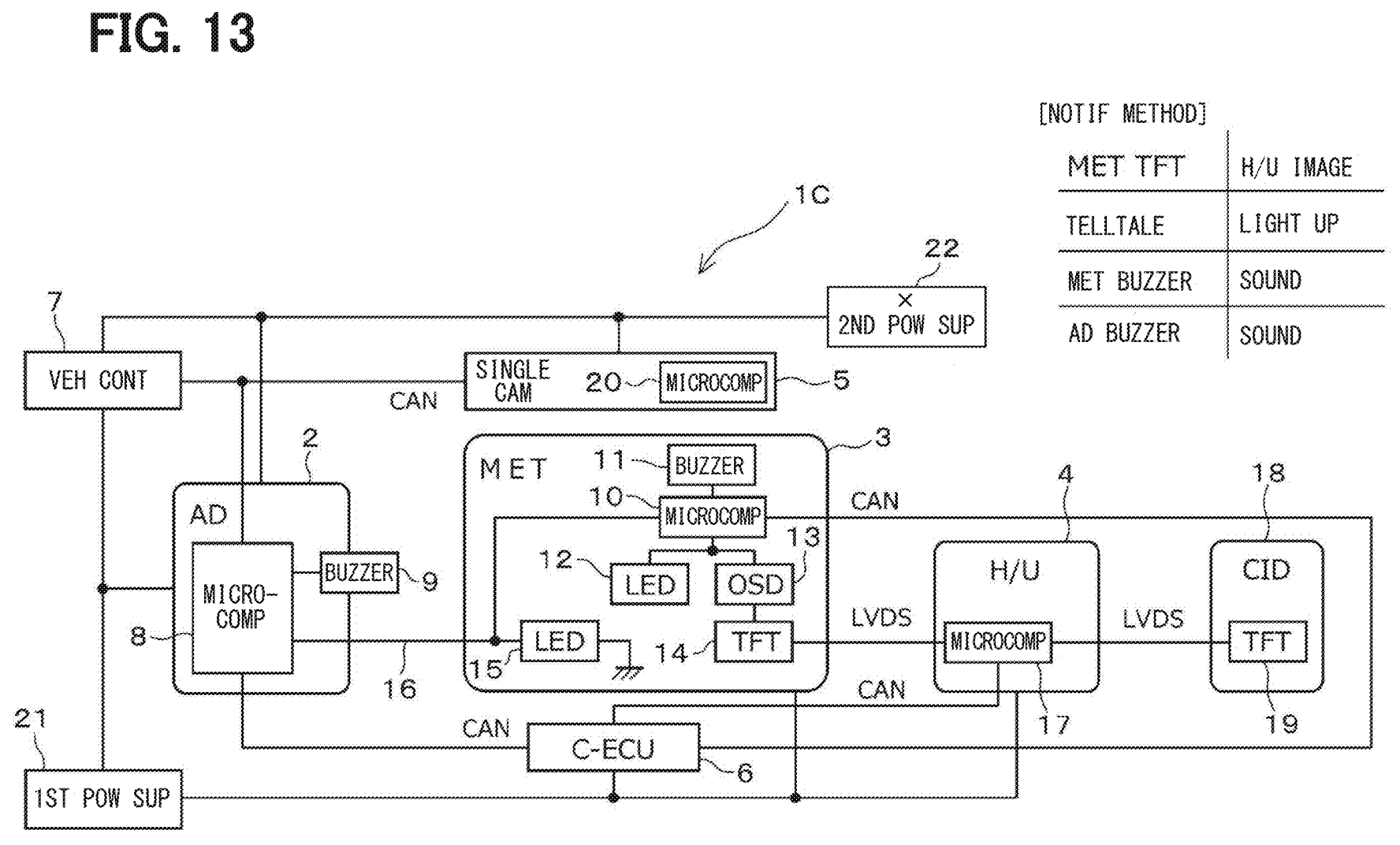

In the vehicle notification system 1C of the fourth embodiment shown in FIGS. 12 and 13, the electric power is supplied to the meter ECU 3 from the first power source 21 instead of the second power source 22 in the configuration of the first embodiment. In this case, in the case where the first power supply 21 is lost as shown in FIG. 12, the drawing display of the TFT 14 and the sounding of the buzzer 11 are not performed, and the driving control ECU 2 only turns on the LED 15 and sounds the buzzer 9.

Further, when the second power supply 22 shown in FIG. 13 is lost, the driving control ECU 2 lights up the LED 15 and sounds the buzzer 9, the meter ECU 3 sounds the buzzer 11, and the H/U 4 displays using the TFT 14.

Fifth Embodiment

Figure 14:
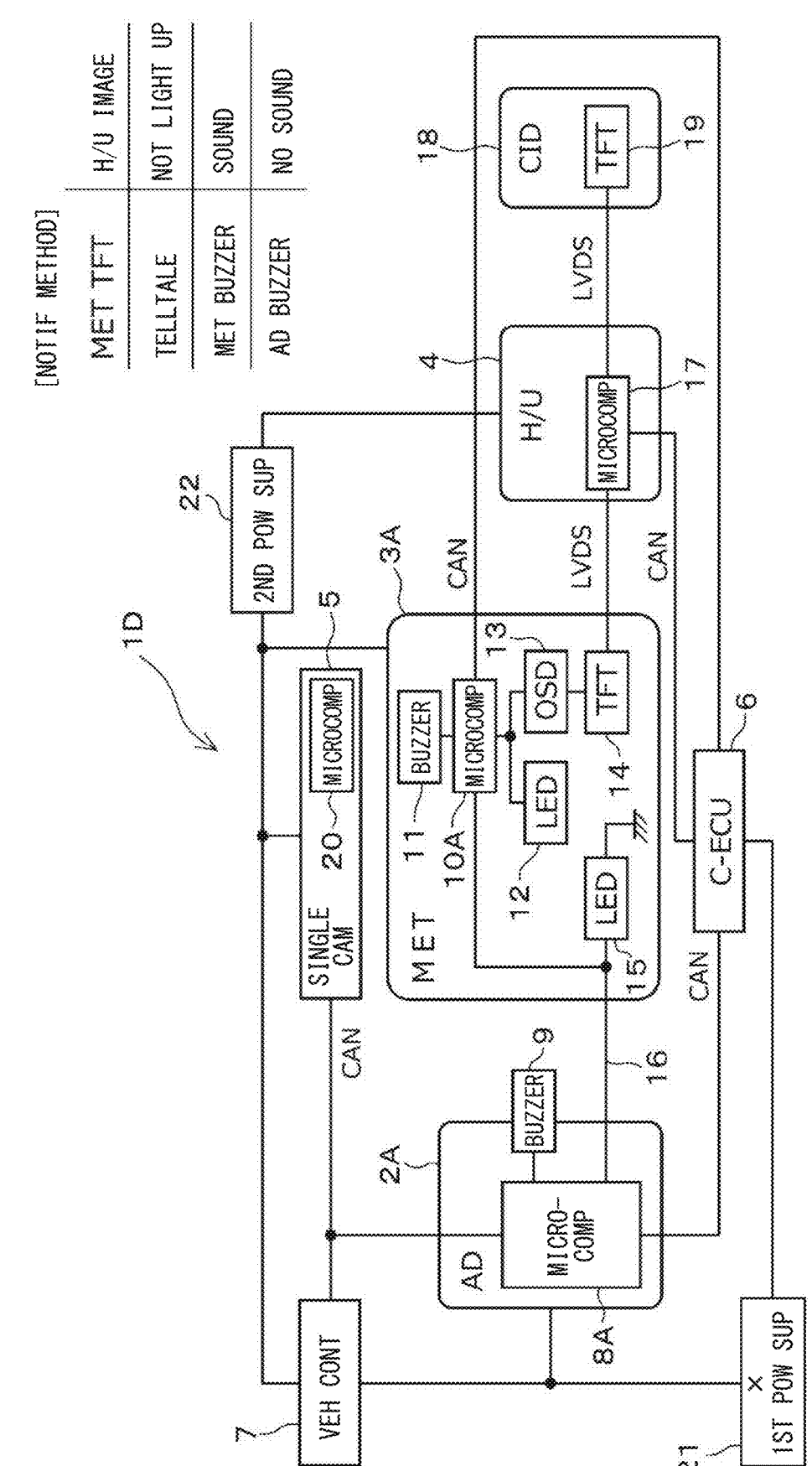
FIG. 14 is a functional block diagram showing the configuration of a vehicle notification system according to a fifth embodiment, and showing a state in which a first power source is lost.
Figure 15:
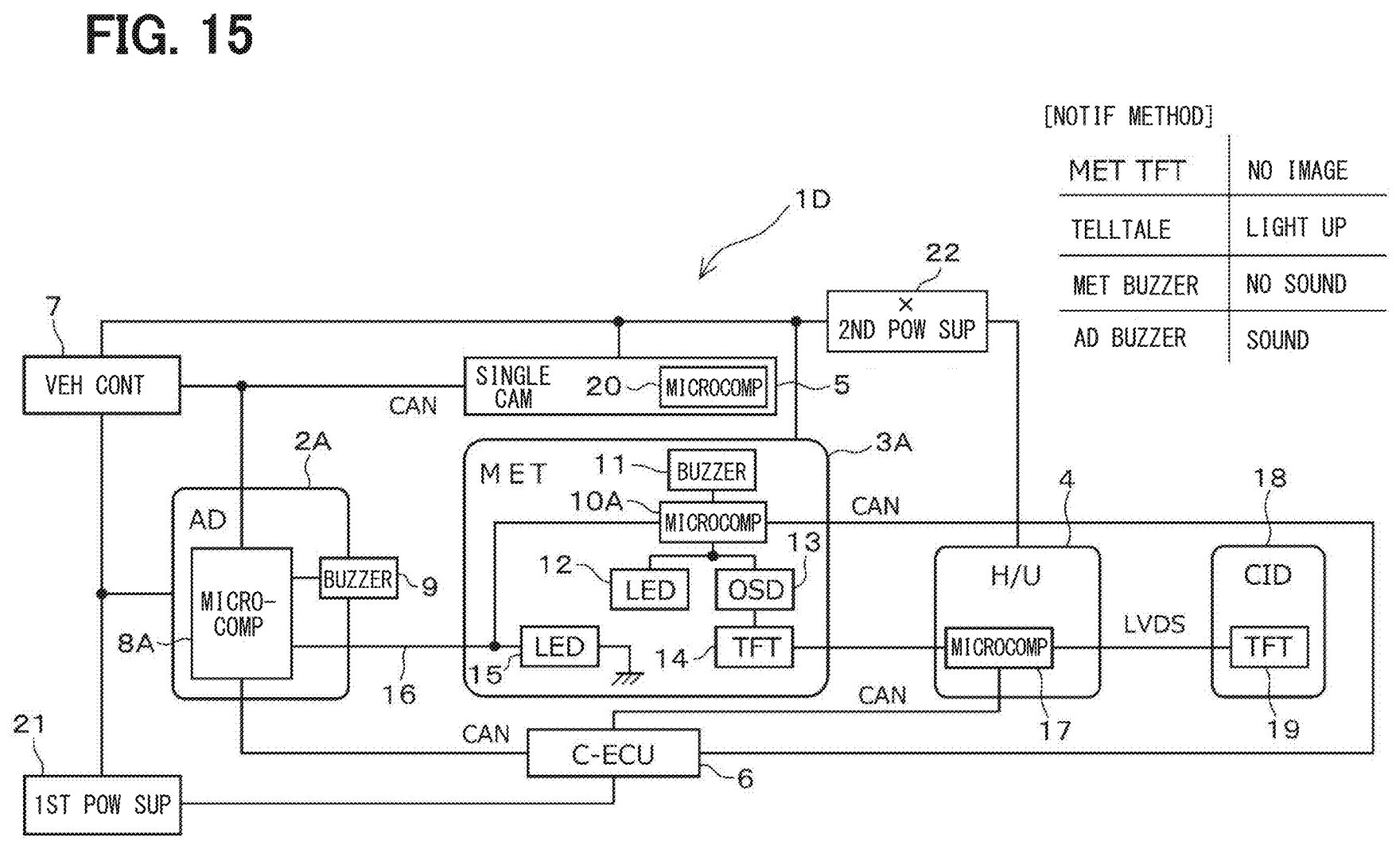

In the vehicle notification system 1D of the fifth embodiment shown in FIGS. 14 and 15, the electric power is supplied to the H/U 4 from the second power source 22 instead of the first power source 21 in the configuration of the second embodiment. In this case, the case where the first power supply 21 is lost shown in FIG. 14 is different from the case shown in FIG. 3 in that the drawing display of the TFT 14 is performed by the H/U 4. Further, the case where the second power supply 22 shown in FIG. 15 is lost is the same as the case shown in FIG. 4.

Sixth Embodiment

Figure 16:
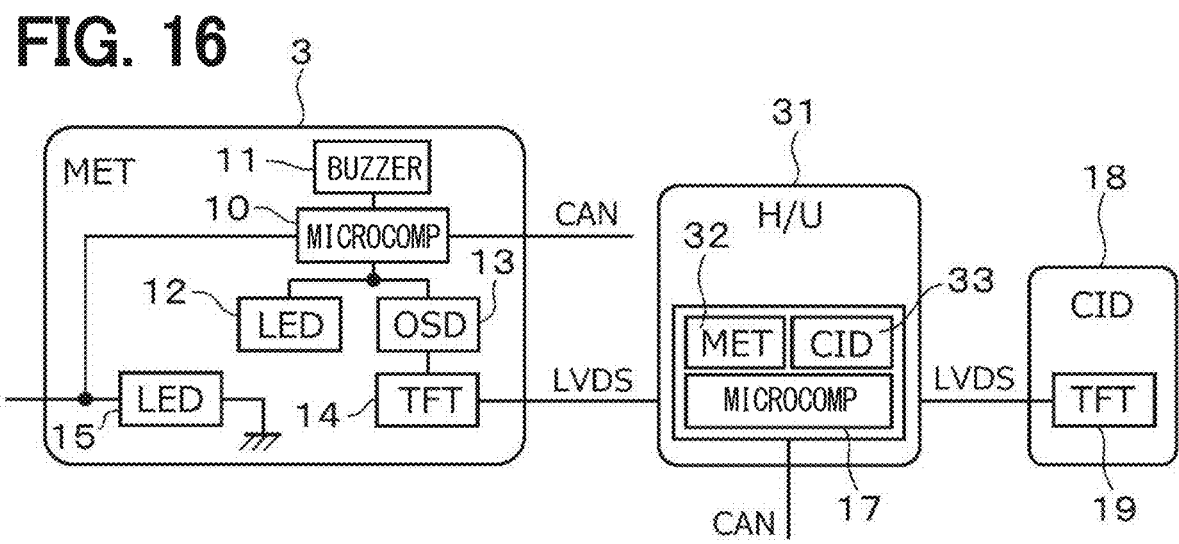
FIG. 16 is a diagram showing variations in the functional arrangement of the meter ECU and the H/U according to the sixth embodiment.
Figure 17:
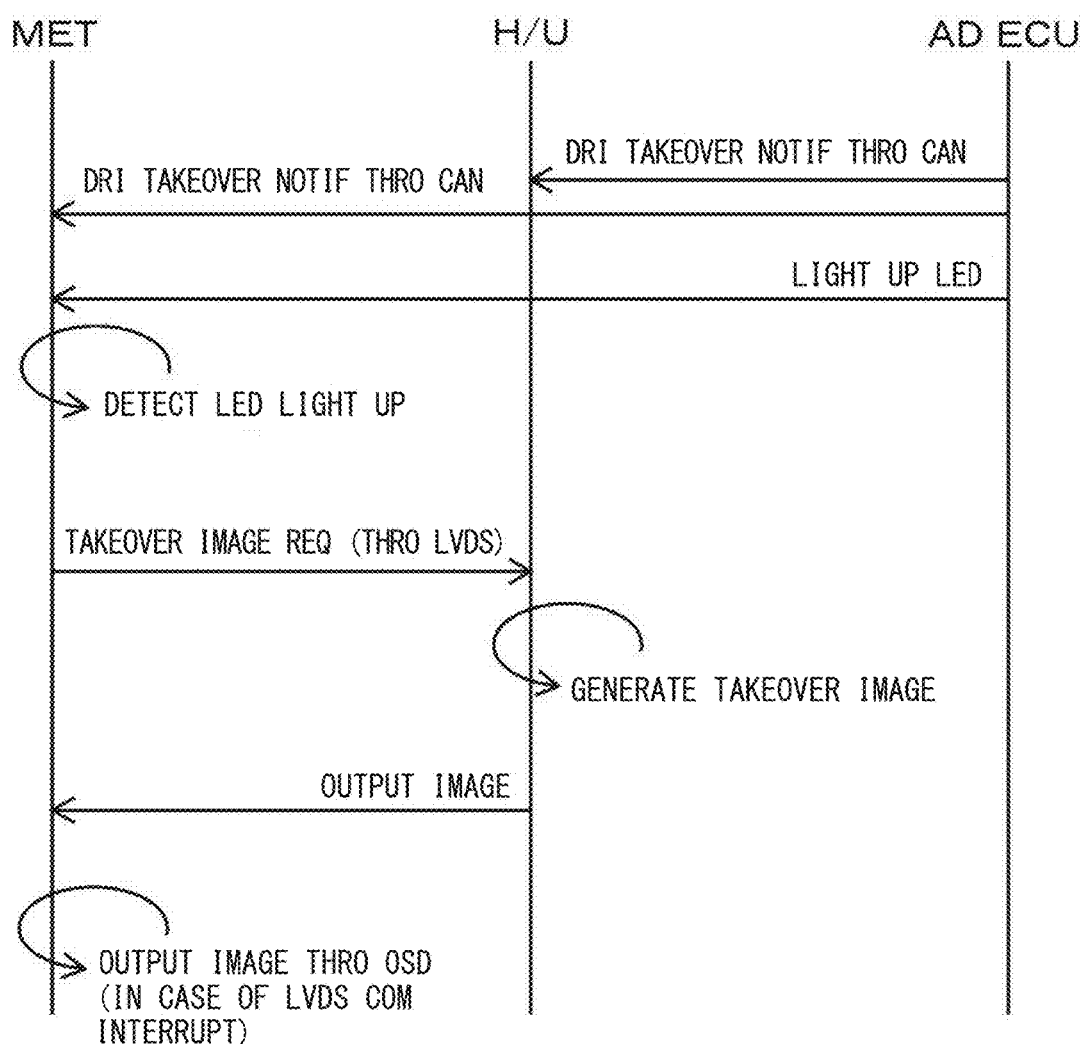
FIG. 17 is a sequence diagram showing processing between the driving control ECU, the H/U, and the meter ECU in case of the CAN communication.

The sixth to eighth embodiments shown below show variations in the functional arrangement of the meter ECU and the H/U. In the sixth embodiment shown in FIGS. 16 and 17, a microcomputer 17 is mounted in the H/U 31. On the microcomputer 17, a plurality of operating systems (i.e., OSs), not shown, are running in parallel via a virtual environment (i.e., hypervisor), not shown. Furthermore, the meter 32 as an application for controlling the display of the meter is installed on one of the plurality of OSs. In addition, the CID 33, which is an application for controlling the display on CID 18 mainly having an infotainment function is installed on another one of the OSs.

Information such as vehicle speed and telltale required for meter display control is input to the meter ECU 3 through the CAN communication and processed by the microcomputer 10. Thereafter, information for drawing and displaying on the TFT 14 is transmitted from the microcomputer 10 to the H/U 21 by the LVDS communication. When the H/U 31 generates the image data based on the information, the H/U 31 transmits it to the meter ECU 3 via the LVDS communication.

The above sequence is performed in the same manner as in FIG. 10 or 11. Here, if the LVDS communication with the H/U 31 is interrupted, the meter ECU 3 controls the display on the TFT 14 via the OSD 13.

Seventh Embodiment

Figure 18:
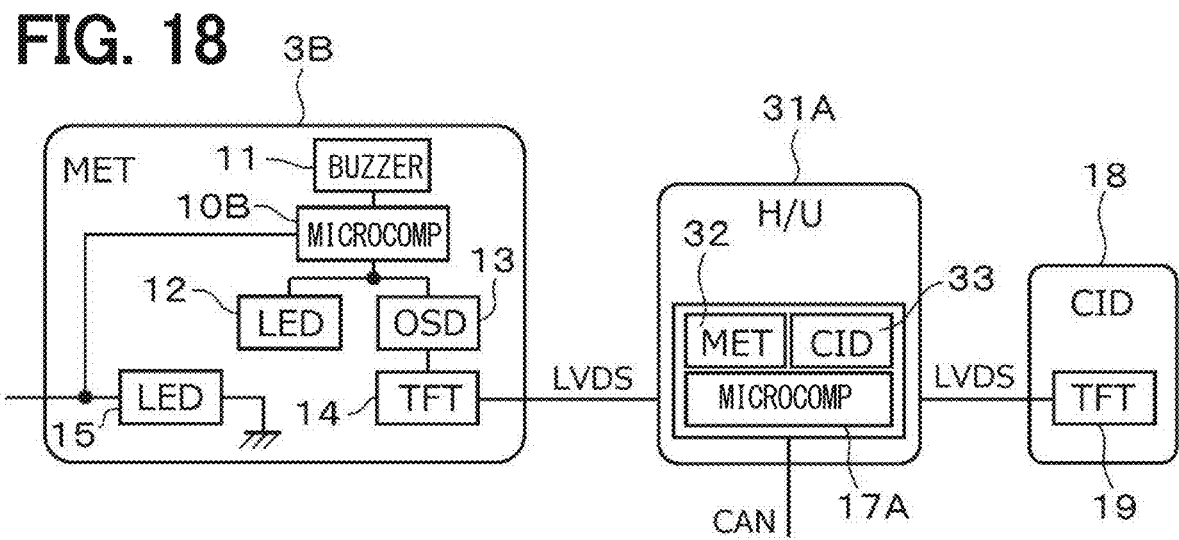
FIG. 18 is a diagram showing variations in the functional arrangement of the meter ECU and the H/U according to the seventh embodiment.
Figure 19:
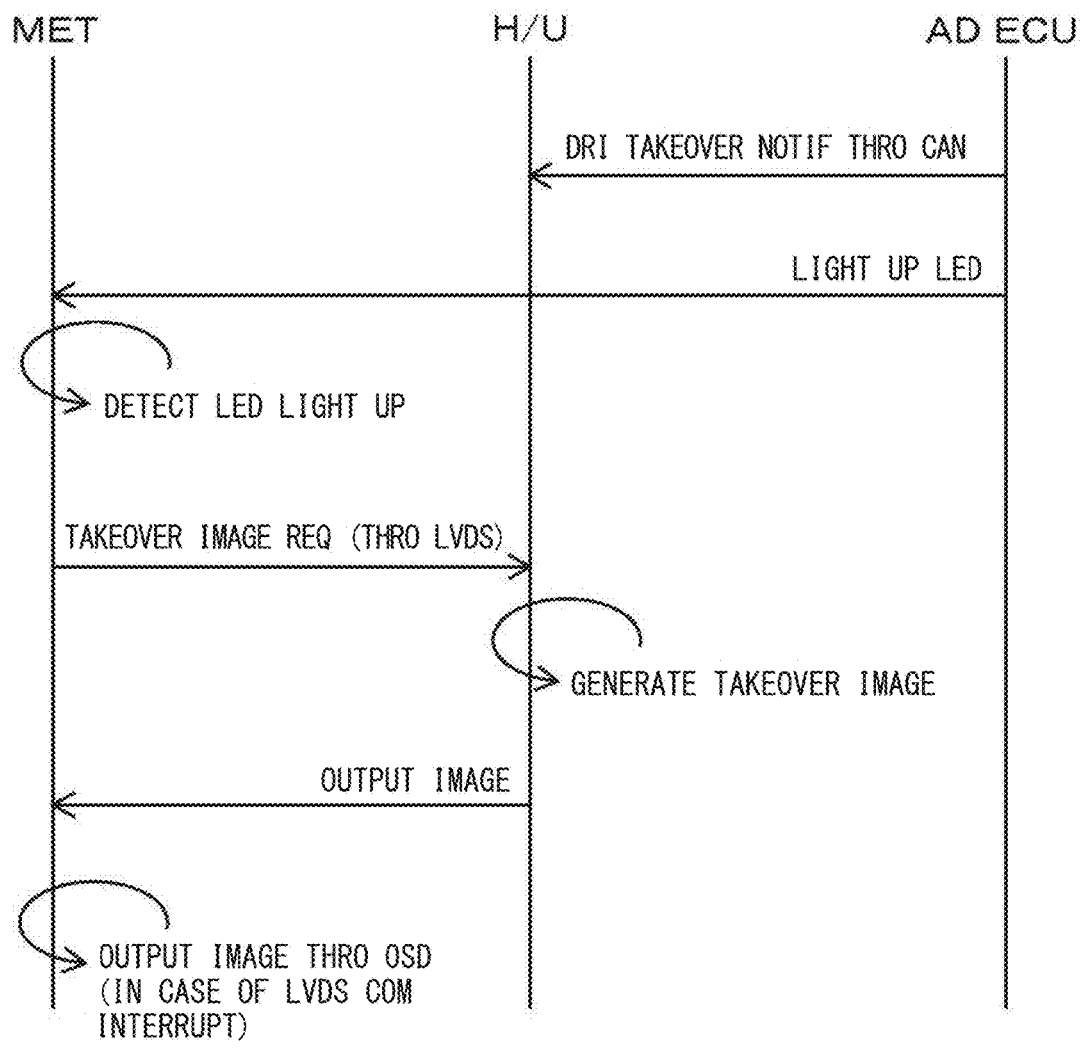
FIG. 19 is a sequence diagram showing processing between the driving control ECU, the H/U, and the meter ECU in case of the CAN communication.

In the seventh embodiment shown in FIGS. 18 and 19, the microcomputer 10B of the meter ECU 3B does not perform the CAN communication. The information necessary for the meter display control is input to the microcomputer 17A of the H/U 31A through the CAN communication, and is processed by the microcomputer 17A. Thereafter, when the image data is generated based on the input information, it is transmitted to the meter ECU 3B via the LVDS communication. As shown in FIG. 19, if the CAN communication is available, the driving control ECU 2 notifies the H/U 31A of the driving operation takeover. The subsequent processing is similar to that in FIG. 17.

Eighth Embodiment

Figures 20, 21:
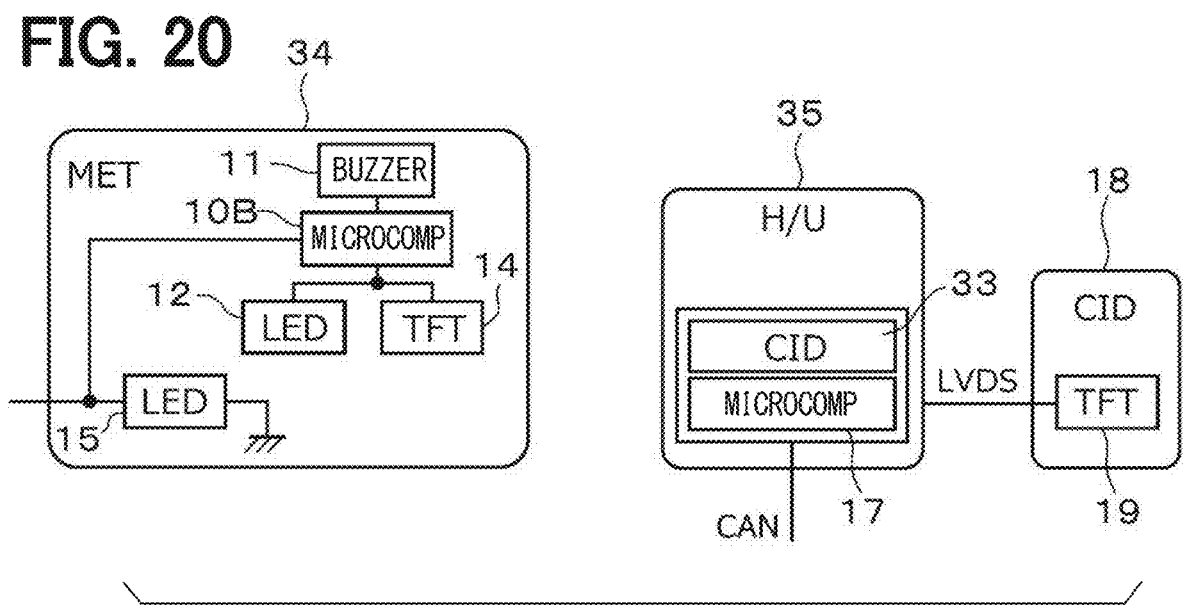
FIG. 20 is a diagram showing variations in the functional arrangement of the meter ECU and the H/U according to the eighth embodiment.
FIG. 21 is a sequence diagram showing processing between the driving control ECU, and the meter ECU in case of the CAN communication.

In the eighth embodiment shown in FIG. 20, the meter ECU 34 does not include the OSD 13. The H/U 35 includes only a microcomputer 17 and a display 33. The information necessary for the meter display control is input to the microcomputer 17 of the H/U 35 through the CAN communication, and is processed by the microcomputer 17. Thereafter, the H/U 35 generates the image data based on the input information, transmits it to the center display 18 via the LVDS communication, and displays it on the TFT 19.

As shown in FIG. 21, the driving takeover notification is performed between the vehicle control ECU 2 and the meter ECU 34. When the vehicle control ECU 2 notifies the meter ECU 34 of the driving takeover via the CAN communication and lights up the LED 15, the meter ECU 34 detects the lighting of the LED 15 and generates the image data for driving takeover notification. FIG. 22 collectively shows each notification mode of the sixth to eighth embodiments.

Other Embodiments

The electric power supply to each component may not necessarily have to be carried out in two separate systems. The lighting display unit may not be limited to the LED, and the drawing display unit may not be limited to the TFT. The H/U and the camera ECU may be provided as necessary. The protocol used for communication between ECUs may not be limited to the CAN or the LVDS, but may be any protocol that can be used for communication between ECUs.

Although the present disclosure has been described in accordance with the examples, it is understood that the disclosure is not limited to such examples or structures. The present disclosure incorporates various modifications and variations within the scope of equivalents. Furthermore, various combination and formation, and other combination and formation including one, more than one or less than one element may be made within the spirit and scope of the present disclosure.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle notification system comprising:

a driving control electronic control unit (ECU) that controls an autonomous driving operation of a vehicle; and a display control ECU that controls a meter display of an instrument panel and a display of a drawing display unit, wherein:

the display control ECU includes a lighting display unit that notifies a driver of the vehicle in a lighting state;

the lighting display unit is driven by the driving control ECU;

the display control ECU notifies the driver by executing the display of the drawing display unit when the driving control ECU detects that the lighting display unit turns on;

the driving control ECU controls the lighting display unit to be one of three levels, which are a high level that turns on the lighting display unit, a low level that is a ground level, and an intermediate level that is higher than the low level but that does not turn on the lighting display unit;

the lighting display unit is driven at the high level by the driving control ECU;

the driving control ECU outputs a voltage at the intermediate level for maintaining the lighting display unit in an off state from an output port for driving the lighting display unit;

the driving control ECU outputs the voltage at the intermediate level from the output port when the driving control ECU is operating normally;

the display control ECU executes the display of the drawing display unit when detecting that the voltage of the output port falls below the intermediate level;

a feature that the driving control ECU is operating normally indicates that the driving control ECU outputs a voltage of one of the high level and the intermediate level; and a feature that the driving control ECU is not operating normally indicates that the driving control ECU outputs a voltage of the low level.

2. The vehicle notification system according to claim 1, wherein:

the display control ECU includes another lighting display unit that notifies the driver of the vehicle in a lighting state; and when detecting that the driving control ECU is not operating normally, the display control ECU lights up the another lighting display unit provided therein.

3. The vehicle notification system according to claim 1, further comprising:

an upper level display control ECU that communicates with the display control ECU and controls the display of the drawing display unit with information; and when the driving control ECU detects that the lighting display unit turns on, and the display control ECU is communicable with the upper level display control ECU, the display control ECU causes the upper level display control ECU to control the display of the drawing display unit.

* * * * *